US012614371B2

(12) United States Patent
Hsin et al.

(10) Patent No.: US 12,614,371 B2
(45) Date of Patent: Apr. 28, 2026

(54) MULTI-CAMERA PEOPLE MATCHING AND SELECTION METHOD

(71) Applicant: Kneron (Taiwan) Co., Ltd., Taipei City (TW)

(72) Inventors: Hsien-Kai Hsin, Taipei City (TW); Shr-Tze Wan, Taipei City (TW); Chih-Yu Wang, Hsinchu City (TW); Yi-Je Lin, New Taipei City (TW); Ya-Lun Shih, Taipei City (TW)

(73) Assignee: Kneron (Taiwan) Co., Ltd., Taipei City (TW)

( * ) Notice: Subject to any disclaimer, the term of this patent is extended or adjusted under 35 U.S.C. 154(b) by 305 days.

(21) Appl. No.: 18/505,139

(22) Filed: Nov. 9, 2023

(65) Prior Publication Data

US 2025/0157186 A1     May 15, 2025

(51) Int. Cl.
*G06V 10/74* (2022.01)
*G06T 7/60* (2017.01)
(Continued)

(52) U.S. Cl.
CPC .............. *G06V 10/761* (2022.01); *G06T 7/60* (2013.01); *G06V 10/44* (2022.01); *G06V 10/62* (2022.01);
(Continued)

(58) Field of Classification Search
CPC . G06T 2207/20044; G06T 2207/20132; G06T 7/60; G06V 10/44; G06V 10/62;
(Continued)

(56) References Cited

U.S. PATENT DOCUMENTS 8,861,783 B1 * 10/2014 Peleg ............... A61B 1/000094
382/100
10,592,742 B1 * 3/2020 Hua ....................... G06V 10/56
(Continued)

FOREIGN PATENT DOCUMENTS

| CN | 107430679 A | 12/2017 |
| TW | 201901527 A | 1/2019 |
| TW | I807513 B | 7/2023 |

*Primary Examiner* — Gregory A Morse
*Assistant Examiner* — Stefano Anthony Dardano
(74) *Attorney, Agent, or Firm* — Winston Hsu

(57) ABSTRACT

A multi-camera people matching and selection method includes capturing a plurality of images by a plurality of cameras in a space, analyzing the plurality of images captured by the plurality of cameras to generate a plurality of member features by using a machine learning model, transmitting the plurality of member features and corresponding cropped or full images to a plurality of corresponding buffers, synchronizing the plurality of member features and the corresponding cropped or full images according to temporal proximities in the corresponding buffers, generating a matching result according to differences of corresponding feature embeddings and spatial relationships realized by object detection or direction of audio to identify a member, adjusting preference scores of members based on member features for displaying the appearance of the member smoothly, adjusting display scores of members according to presences of the members, and displaying images of best appearance.

14 Claims, 4 Drawing Sheets

(51) Int. Cl.
    *G06V 10/44*        (2022.01)
    *G06V 10/62*        (2022.01)
    *G06V 40/16*        (2022.01)

(52) U.S. Cl.
    CPC .. *G06V 40/171* (2022.01); *G06T 2207/20044*
        (2013.01); *G06T 2207/20132* (2013.01); *G06V*
        *2201/07* (2022.01)

(58) Field of Classification Search
    CPC .. G06V 10/761; G06V 10/82; G06V 2201/07;
        G06V 40/171; G06V 40/173; G06V
        40/16; G06V 40/168; G06V 40/165
    See application file for complete search history.

(56) References Cited

U.S. PATENT DOCUMENTS

| | | | |
|---|---|---|---|
| 2012/0020518 A1* | 1/2012 | Taguchi | G06T 7/292 |
| | | | 382/103 |
| 2017/0068859 A1* | 3/2017 | Qian | G06V 10/761 |
| 2018/0225852 A1* | 8/2018 | Um | G06V 40/103 |
| 2022/0122316 A1* | 4/2022 | Huffman | G06T 7/579 |
| 2022/0198825 A1* | 6/2022 | Reinisch | G06V 40/168 |
| 2022/0392104 A1* | 12/2022 | Zeng | G06F 3/012 |
| 2023/0337636 A1* | 10/2023 | Shmigelsky | G06V 30/147 |
| 2023/0419674 A1* | 12/2023 | Sommer | G06V 10/7715 |
| 2024/0144720 A1* | 5/2024 | Pleet | G06V 40/172 |
| 2025/0005906 A1* | 1/2025 | Shanmuga | G06V 10/766 |

* cited by examiner

MULTI-CAMERA PEOPLE MATCHING AND SELECTION METHOD

BACKGROUND OF THE INVENTION

1. Field of the Invention

The present invention relates to a people matching and selection method, and more particularly, a multi-camera people matching and selection method.

2. Description of the Prior Art

Video conference, also known as online conference, allows members in an organization to communicate through video-enabled platforms on computers, smart devices, or remote collaboration tools. This type of communication tool helps remote members connect with other members while working, and allows the remote members to work together in real time even if they are not at the same place.

A video conference needs at least a computer, a laptop, a smartphone, or other advanced device with a webcam, a microphone, and a speaker. Modern computers and smart devices have these technologies such as a webcam, a microphone, and a speaker built in default.

When a remote member needs network access, the remote member must download and install video conference software or applications to communicate with other members. Then, the software shows all member appearances captured by a camera in the physical space for display. However, there might be too many participants to capture all members clearly thus it is more common to use more than one camera. When there are multiple cameras, it is desirable to pair each unique member and select one of the appearances from the participant for the display. Moreover, the remote member may sometimes unintentionally turn away from the camera that is capturing the member and thus other parties won't be able to see the front face of the remote member any longer. Therefore, an automatic people matching and selection system which enables the smooth display of the member is needed.

SUMMARY OF THE INVENTION

A multi-camera people matching and selection method includes capturing a plurality of images by a plurality of cameras in a space, analyzing the plurality of images captured by the plurality of cameras to generate a plurality of member features by using a machine learning model, transmitting the plurality of member features and corresponding cropped or full images to a plurality of corresponding buffers, synchronizing the plurality of member features and the corresponding cropped or full images according to temporal proximities in the corresponding buffers, generating a matching result according to differences of corresponding feature embeddings and spatial relationships realized by object detection or direction of audio to identify a member, adjusting preference scores of members based on member features for displaying the appearance of the member smoothly, adjusting display scores of members according to presences of the members, and displaying images of best appearance.

These and other objectives of the present invention will no doubt become obvious to those of ordinary skill in the art after reading the following detailed description of the preferred embodiment that is illustrated in the various figures and drawings.

DETAILED DESCRIPTION

The definition of "feature" in this article should be defined to avoid confusion. "Feature embedding" is defined as an n-dimension vector. For example, a whole-body feature embedding is a feature vector in n-dimension describing the entire human body representation. A face feature embedding is the feature vector in n-dimension describing the face representation. "Member feature" is defined as an overall concept and represents all analysis results obtained by artificial intelligence (AI) analysis extracted from images. The analysis results include the feature embedding to identify a specific member. The feature embedding can be whole-body feature embedding, face feature embedding. The analysis results can further include character identification (ID), human keypoints, coordinates and a width and a height of a head, coordinates and a width and a height of a body, and coordinates and a width and a height of a face.

Figure 1:
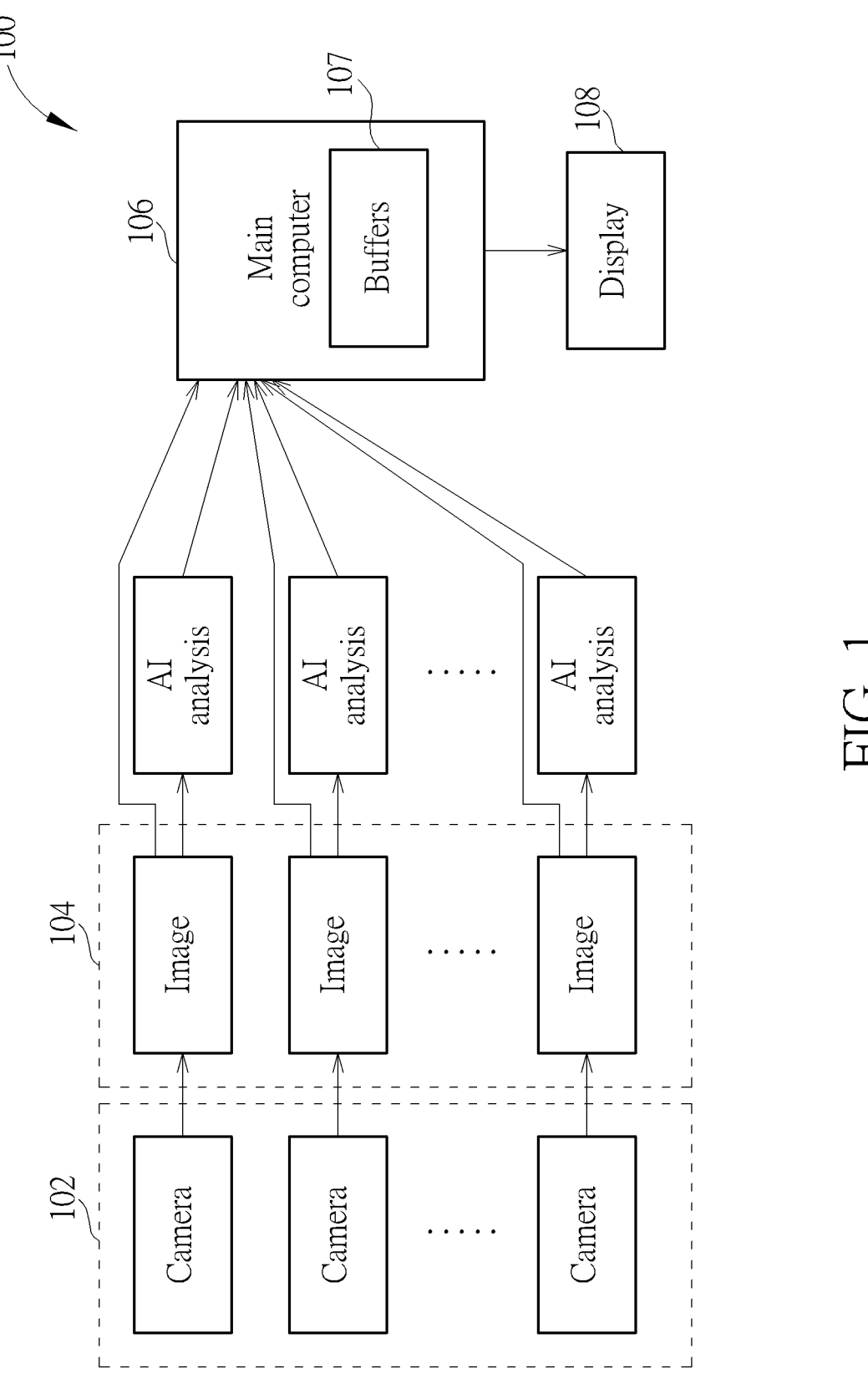
FIG. 1 is a block diagram of an automatic people matching and selection system according to an embodiment of the present invention.

An embodiment proposes an automatic people matching and selection system to always show the front faces of members based on a multi-camera people matching and selection method. FIG. 1 is a block diagram of an automatic people matching and selection system 100 according to an embodiment of the present invention. The automatic people matching and selection system 100 comprises a plurality of cameras 102 for capturing a plurality of images 104 of members in a space and performing an artificial intelligence (AI) analysis on the images 104, a main computer 106, and a display 108. The main computer 106 comprises a plurality of buffers 107. The AI analysis results such as member features and the corresponding cropped or full images are transmitted to corresponding buffers 107 of the main computer 106 to perform synchronization. Then the main computer 106 performs a matching algorithm for generating a result matching the members captured by the plurality of cameras 102. The best appearances such as front faces of the members are then displayed on the display 108. In addition to the display of the best appearance for each member, the display 108 may also display member features such as tracking identifications (IDs), face bounding boxes, and human keypoints in the video conference.

Figure 2:
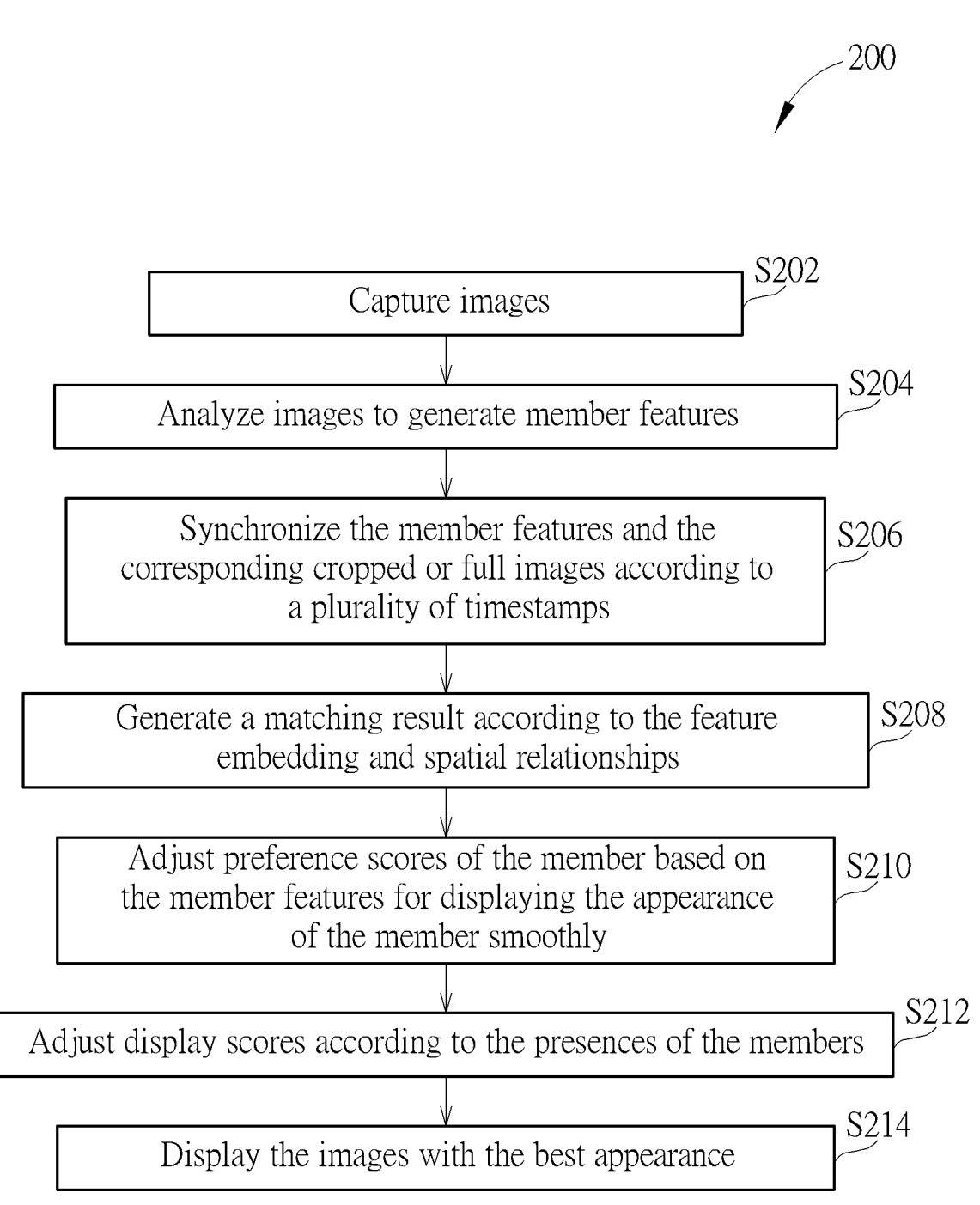
FIG. 2 is the flowchart of a multi-camera people matching and selection method according to an embodiment of the present invention.

FIG. 2 is the flowchart of a multi-camera people matching and selection method 200 according to an embodiment of the present invention. The multi-camera people matching and selection method 200 comprises the following steps:

Step S202: capture the plurality of images 104 by the plurality of cameras 102 in a space;

Step S204: analyze the plurality of images 104 to generate a plurality of member features by using a machine learning model;

Step S206: transmit the plurality of member features and the corresponding cropped or full images to the plurality of corresponding buffers 107 of the main computer 106 and synchronizing the plurality of member features and the corresponding cropped or full images according to a plurality of timestamps in corresponding buffers 107;

Step S208: generate a matching result according to differences of corresponding feature embeddings and spatial relationships realized by object detection or direction of audio to identify a member by the main computer 106;

Step S210: adjust the preference scores of the members based on the plurality of member features for displaying the appearance of the member smoothly;

Step S212: adjust display scores of the members according to presences of the members; and Step S214: display images of the best appearance.

In step S202, the plurality of images 104 of members are captured by the plurality of cameras 102 in the same space in a video conference. In step S204, the plurality of input images 104 captured by the plurality of cameras 102 are analyzed to generate the plurality of member features by using the machine learning model. The member features may include human keypoints, a human being identification (ID), a whole-body feature embedding, coordinates and a width and a height of a head of the human being, coordinates and a width and a height of a body of the human being, and coordinates and a width and a height of a face of the human being. The human keypoints can include but is not limit to a right eye, a left eye, a nose, a right side of lip, a left side of lip, a right shoulder, a left shoulder, a right elbow, a left elbow, a right wrist, and a left wrist. The machine learning model can be a convolutional neural network (CNN), an artificial intelligence (AI) model, a deep learning model, a you only look once (YOLO) model, a computer vision model, a vision transformer, or other useful models.

In step S206, the member features outputted from the machine learning model and the corresponding cropped or full images are transmitted to the plurality of corresponding buffers 107. The first buffer saves the member features of members and the corresponding cropped or full images from the first camera. The second buffer saves the member features of members and the corresponding cropped or full images from the second camera. And the Nth buffer saves the member features of members and the corresponding cropped or full images from the Nth camera. By checking timestamps of the plurality of member features, member features with similar timestamps are selected. If the timestamps of the corresponding member features and cropped or full images are within a tolerant region, then the member features and the respective cropped or full images are synchronizing successfully. That is, the member features and their respective images are aligned to an identical timestamp. Otherwise, the previously available analysis results are re-used for compensation. By doing so, the member features and the respective cropped or full images are synchronized.

In step S208, the differences of corresponding feature embeddings are compared to determine the uniqueness of a member. A matching algorithm such as a Hungarian algorithm is applied to generate a people matching result according to the plurality of member features. The distances between feature embeddings from different buffers are calculated based on a distance algorithm such as a cosine distance algorithm or a Euclidean distance algorithm. A spatial relationship can be also considered by object detection or the direction of audio to predict the potential position of the member.

In step S210, a best appearance stabilization is implemented by identifying best appearance according to the plurality of member features. A best appearance can be a combination of the presence of face, face orientation (for front face), and/or face size in original input. Useful criteria to determine the best appearance based on member features may include whether a head is retrievable, detected information that indicates a front face (e.g. whether a right part of the human being such as a right ear is at a right side of a left part of the human being such as a left ear, a ratio of a distance between a center of the head and a center of the eyes to a width of the head), and the detected sizes of the front faces. When the angle of the front face orientation toward camera is within 90°, the ratio of the distance between the center of the head and the center of the eyes (or any symmetrical facial parts such as ears or oral commissure) to the width of the head decreases with the angle decreases. Therefore, a threshold of the ratio can be used to detect the presence of the front face. When the ratios of a distance between a center of the head and a center of the eyes to a width of the head are lower than a threshold, the relative front faces can be recognized. Moreover, the selection of front faces is decided based on the detected sizes of the front faces. The larger front face indicates the better selection. For example, faces larger than a predetermined size threshold are categorized into a pool of qualified candidates. Within this selection, the face with most prominently position is chosen based on the front-face-ratio. In another embodiment, the influences of front-face-ratio and face size are strategically balanced by a weighting function, ensuring a harmonious consideration of both face orientation and size. Furthermore, a preference score is utilized to decide which image shall be displayed with the best appearance (such as a front face) by smoothing a sequence of decisions causally.

After detecting the member, display scores representing the presence of members can be calculated in step S212. First, a display score of a member is initialized as 1. Secondly, when a member is continuously detected, then the display score is increased constantly. When the display score is increased to a maximum, then the display score is no longer increased. When the member is not detected in the images 104, the display score is decreased exponentially. The display of a member is allowed for replacement by other members only if the display score of the member is lower than a threshold. The drawing region of the member is still occupied if the display score of the member is larger than the threshold (e.g. fill the region with black or draw the icon to represent the region is still occupied if the front face is not detected). In step S214, the front faces and IDs of members are shown in the user interface (UI) according to the display scores and the matching result of the faces.

Figure 3:
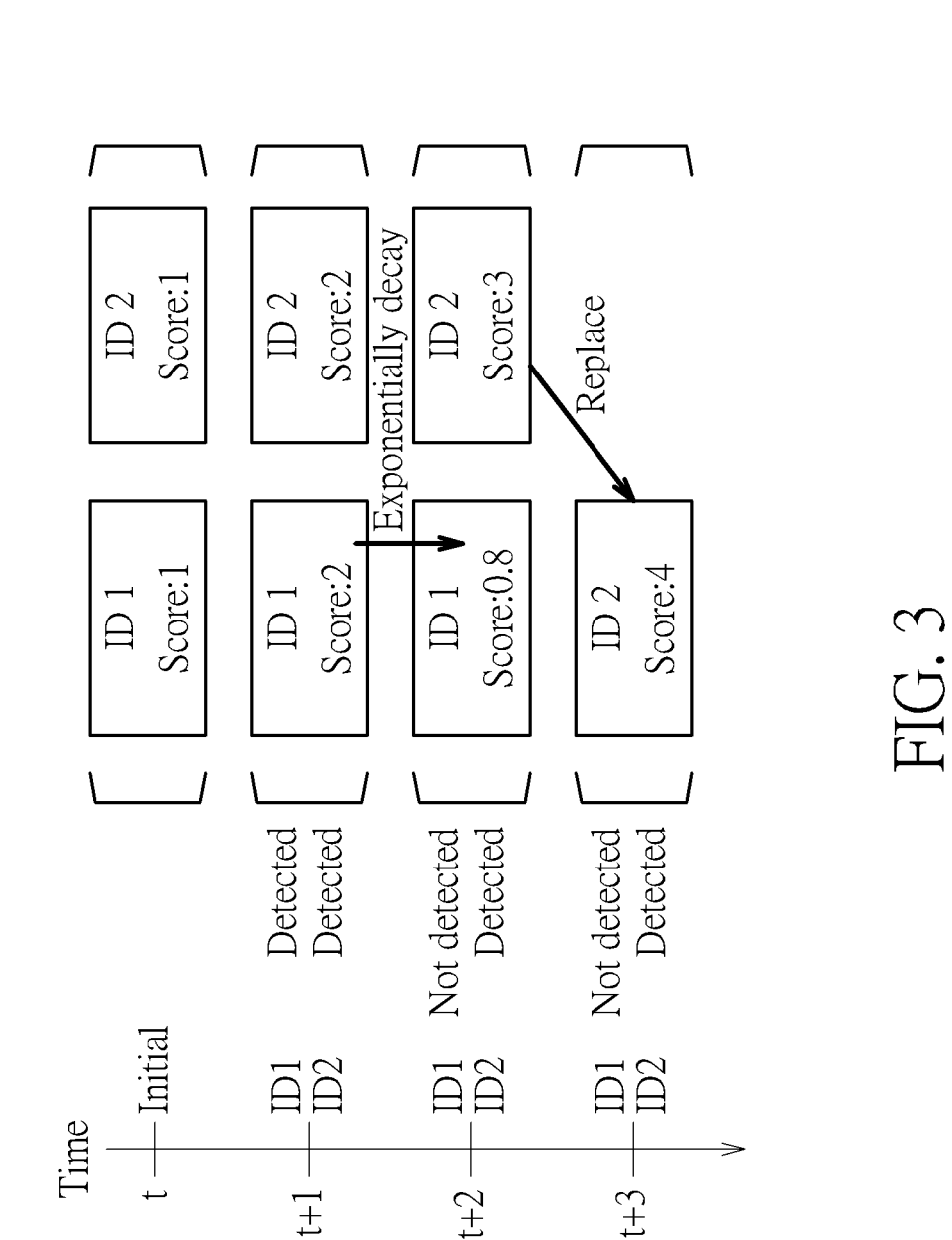
FIG. 3 is a method for display score adjustment and display according to an embodiment of the present invention.

FIG. 3 is a method 300 for display score adjustment and display according to an embodiment of the present invention. At time t, the member with ID1 and the member with ID2 are detected from the images 104 captured by the cameras 102. Therefore, display scores of 1 are given to both members with ID1 and ID2. At time t+1, members from both cameras are detected with ID1 and ID2, so the display scores are incremented to 2 for both members with ID1 and ID2. At time t+2, the member with ID1 is not detected while the member with ID2 continues to be detected in the images 104. Thus the display score of the member with ID1 exponentially decreases to 0.8, and the display score of the member with ID2 is incremented to 3. However, the drawing region of the member with ID1 is still occupied (e.g. fill the region with black or draw the icon to represent the region is still occupied) because the display score is still larger than the threshold (e.g. 0.5). At time t+3, the member with ID1 remains undetected and the display score of the member with ID1 drops to below the threshold. Therefore, the member with ID1 is no longer displayed and the member's position is replaced by the member with ID2 with a display score of 4. The replacement of members is allowed only when the display score of the member drops below a certain threshold like 0.5.

Figure 4:
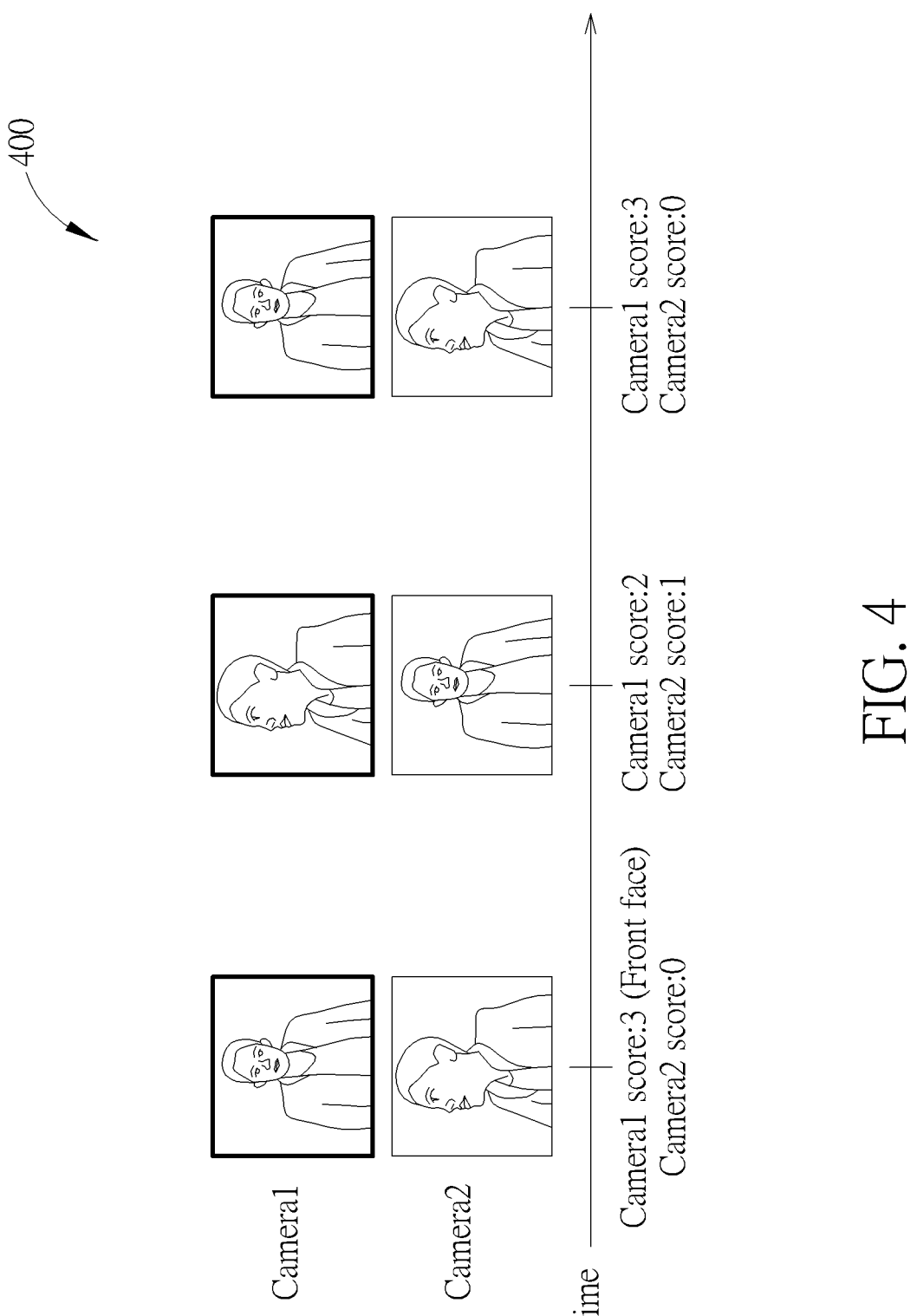
FIG. 4 is a display method for best appearance stabilization according to an embodiment of the present invention.

FIG. 4 is a display method 400 for best appearance stabilization according to an embodiment of the present invention. A best appearance can be selected from the plurality of faces according to the member features. However, when the member rapidly rotates the head, the camera capturing the front face also rapidly changes to another camera, thus the display 108 has to make a rapid change accordingly. To avoid the abrupt switch, a preference score is introduced to solve the problem. In FIG. 4, there are two cameras noted as camera1 and camera2. In the beginning, the preference score of camera1 is 3 because the best appearance (e.g. front face) is captured by camera1 for a 3 period units such as 3 seconds, and the preference score of camera2 is 0 because the image captured by camera2 does not contain the front face for a while. When the member rotates the head and the front face is shown in the image captured by camera2 instead of camera1, the preference score of camera2 is incremented to 1, and the preference score of camera1 is decremented to 2. The preference score of camera1 is still higher than the preference score of camera2, so the image captured by camera1 is still displayed on the display 108. Afterwards, the member turns the head back, and the front face is shown in the image captured by camera1. The preference score of camera1 is then incremented to 3, and the preference score of camera2 is decremented to 0. As a consequence, the image captured by camera1 is continuously displayed in the user interface (UI) due to the frequent presence of best appearance in camera1. By doing so, the image shown in the UI does not make unnecessary changes. The display 108 can display a stable best appearance by calculating the preference scores of the plurality of cameras.

In conclusion, an automatic people matching and selection system which substantially shows the best appearance in the user interface (UI) is implemented by using a multi-camera people matching and selection method based on the embodiment. The AI analysis, synchronization, member matching, best appearance stabilization, display score adjustment, and display are proposed to solve the people matching and selection problem and to provide a convenient and useful method in video conference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-camera people matching and selection method, comprising:

capturing a plurality of images by a plurality of cameras in a space;

analyzing the plurality of images captured by the plurality of cameras to generate a plurality of member features by using a machine learning model;

transmitting the plurality of member features and corresponding cropped or full images to a plurality of corresponding buffers;

synchronizing the plurality of member features and the corresponding cropped or full images according to temporal proximities in the corresponding buffers;

generating a matching result according to differences of corresponding feature embeddings and spatial relationships realized by object detection or direction of audio to identify a member;

adjusting preference scores of members based on member features for displaying an appearance of the member smoothly;

identifying a front side of the member by determining whether a head is retrievable, whether a right part of the head is at a right side of a left symmetrical part of the head, a face size, and a ratio of a distance between a center of the head and a center of eyes to a width of the head;

adjusting display scores of members according to presences of the members; and displaying images of best appearance.

2. The method of claim 1, wherein synchronizing the plurality of the member features and the corresponding cropped or full images according to temporal proximities in the corresponding buffers comprises:

checking timestamps of the plurality of member features and the corresponding cropped or full images;

if the timestamps of the member features and the corresponding cropped or full images are not within a tolerant region, the previously available analysis results are re-used for compensation; and if the member features and the corresponding cropped or full images with similar timestamps are determined to have been generated at the same time, aligning the member features and the corresponding cropped or full images with similar timestamps to an identical timestamp.

3. The method of claim 1, wherein analyzing the plurality of images captured by the plurality of cameras to generate the plurality of member features by using the machine learning model comprises:

extracting member features including human keypoints, a human being identification (ID), a whole-body feature embedding, coordinates and a width and a height of a head of the human being, coordinates and a width and a height of a body of the human being, and coordinates and a width and a height of a face by using a convolutional neural network (CNN), an artificial intelligence (AI) model, a deep learning model, or a computer vision model.

4. The method of claim 3, wherein the artificial intelligence (AI) model is a you only look once (YOLO) model or a vision transformer.

5. The method of claim 1, wherein generating a matching result according to differences of corresponding feature embeddings and spatial relationships realized by object detection or direction of audio to identify the member is generating the matching result according to differences of cosine distances or Euclidean distances of corresponding feature embeddings and spatial relationships realized by object detection or direction of audio to identify the member.

6. The method of claim 1, wherein generating a matching result according to differences of corresponding feature embeddings and spatial relationships realized by object detection or direction of audio to identify the member is generating a matching result according to differences of corresponding feature embeddings by a Hungarian algorithm and spatial relationships realized by object detection or direction of audio to identify the member.

7. The method of claim 1, wherein adjusting the display scores of the members according to the presences of the members comprises:

initializing a display score of a member;

increasing the display score when a member is continuously detected;

stopping increasing the display score after the display score reaches a maximum; and decreasing the display score exponentially when the member is not detected.

8. The method of claim 7, further comprising stopping showing the member when the display score is below the threshold.

9. The method of claim 7, further comprising allowing replacement of the member by other members when the display score is below the threshold.

10. The method of claim 7, further comprising showing the best appearance of the member when the display score is larger than the threshold.

11. The method of claim 10, wherein the best appearance of the member is a front face of the member, a black image or an icon.

12. The method of claim 1, further comprising:

initializing a preference score to each unique member detected in each camera;

increasing the preference score when a front face is continuously detected in the camera;

stopping increasing the preference score after the preference score reaches a maximum;

decreasing the preference score when the front face is not detected in the camera; and display the best appearance image in the camera with the maximum preference score.

13. The method of claim 12, wherein decreasing the preference score when the front face is not detected in the camera is decreasing the preference score constantly or exponentially when the front face is not detected in the camera.

14. The method of claim 1, wherein displaying images of best appearance comprises:

displaying images of the members if the display scores of the members exceed a threshold; and hiding images of the members if the display scores of the members is below the threshold.

* * * * *